United States Patent
Ito et al.

(10) Patent No.: US 6,763,799 B2
(45) Date of Patent: Jul. 20, 2004

(54) INTERNAL COMBUSTION ENGINE AND CONTROL METHOD OF THE SAME

(75) Inventors: Takekazu Ito, Toyota (JP); Hiroki Matsuoka, Toyota (JP); Tatsumasa Sugiyama, Anjyo (JP); Yasuhiro Ohtsubo, Toyota (JP); Taro Aoyama, Susono (JP); Jun Tahara, Toyota (JP); Mamoru Oki, Chiryuu (JP); Masakuni Yokoyama, Toyota (JP); Hideyuki Kusatugu, Anjou (JP); Keiichi Mizuguchi, Kariya (JP)

(73) Assignees: Toyota Jidosha Kabushiki Kaisha, Toyota (JP); Denso Corporation, Kariya (JP); Kabushiki Kaisha Toyota Jidoshokki, Kariya (JP)

( * ) Notice: Subject to any disclaimer, the term of this patent is extended or adjusted under 35 U.S.C. 154(b) by 12 days.

(21) Appl. No.: 10/305,968

(22) Filed: Nov. 29, 2002

(65) Prior Publication Data

US 2003/0116123 A1 Jun. 26, 2003

(30) Foreign Application Priority Data

Nov. 30, 2001 (JP) ....................................... 2001-367118

(51) Int. Cl.⁷ .......................... F02M 25/07; F02B 17/00; F02B 3/04
(52) U.S. Cl. .................... 123/299; 123/568.21; 123/295
(58) Field of Search ................................ 123/295, 299, 123/300, 304, 305, 568.21, 568.11, 430; 60/274, 276, 278, 284, 285, 286

(56) References Cited

U.S. PATENT DOCUMENTS

| | | | |
|---|---|---|---|
| 5,890,360 A | 4/1999 | Sasaki et al. | .................. 60/278 |
| 5,937,639 A | 8/1999 | Sasaki et al. | .................. 60/278 |
| 6,055,968 A | 5/2000 | Sasaki et al. | .......... 123/568.21 |
| 6,101,999 A | 8/2000 | Ohashi et al. | ............... 123/295 |
| 6,109,025 A | 8/2000 | Murata et al. | ................. 60/297 |
| 6,129,075 A | 10/2000 | Murata et al. | ......... 123/568.21 |
| 6,131,388 A | 10/2000 | Sasaki et al. | ................. 60/286 |
| 6,142,119 A | 11/2000 | Abe et al. | .................... 123/435 |

(List continued on next page.)

FOREIGN PATENT DOCUMENTS

| | | |
|---|---|---|
| JP | A 11-200839 | 7/1999 |
| JP | A 2000-34944 | 2/2000 |
| JP | A 2000-64879 | 2/2000 |
| JP | A 2000-64911 | 3/2000 |
| JP | B 3061019 | 4/2000 |
| JP | A 2000-110669 | 4/2000 |
| JP | A 2000-130268 | 5/2000 |
| JP | B2 3094992 | 8/2000 |

OTHER PUBLICATIONS

U.S. patent application Ser. No. 09/831,559, Sasaki et al., filed Jul. 3, 2001.
U.S. patent application Ser. No. 09/853,157, Yoshizaki et al., filed May 11, 2001.
U.S. patent application Ser. No. 09/880,110, Sasaki et al., filed Jun. 14, 2001.
U.S. patent application Ser. No. 09/964,489, Sasaki, filed Sep. 28, 2001.

*Primary Examiner*—Willis R. Wolfe
(74) *Attorney, Agent, or Firm*—Oliff & Berridge, PLC (57) ABSTRACT

An internal combustion is capable of switching, during engine operation, between a low-temperature combustion state in which an intake air with a high EGR rate is burned to operate the engine, and a normal combustion state in which an intake air with a low EGR rate is burned to operate the engine. In the internal combustion engine, a pilot injection is executed in addition to a main fuel injection, and furthermore the execution of the pilot injection is restricted during the engine operation with a combustion state switched to the low-temperature combustion state.

28 Claims, 4 Drawing Sheets

U.S. PATENT DOCUMENTS

| | | | |
|---|---|---|---|
| 6,152,118 A | 11/2000 | Sasaki et al. | 123/568.21 |
| 6,209,515 B1 | 4/2001 | Gotoh et al. | 123/305 |
| 6,216,676 B1 | 4/2001 | Gotoh et al. | 123/568.21 |
| 6,240,721 B1 | 6/2001 | Ito et al. | 60/274 |
| 6,240,723 B1 * | 6/2001 | Ito et al. | 123/568.21 |
| 6,276,130 B1 | 8/2001 | Ito et al. | 60/278 |
| 6,378,297 B1 | 4/2002 | Ito et al. | 60/284 |
| 6,470,850 B1 | 10/2002 | Sasaki et al. | 123/305 |
| 6,679,052 B2 * | 1/2004 | Nakatani et al. | 60/286 |
| 2003/0217732 A1 * | 11/2003 | Kataoka et al. | 123/299 |
| 2003/0230276 A1 * | 12/2003 | Kataoka et al. | 123/295 |

* cited by examiner

INTERNAL COMBUSTION ENGINE AND CONTROL METHOD OF THE SAME

INCORPORATION BY REFERENCE

This disclosure of Japanese Patent Application No. 2001-367118 filed on Nov. 30, 2001 including the specification, drawings and abstract is incorporated herein by reference in its entirety.

BACKGROUND OF THE INVENTION

1. Field of Invention

The invention relates to an internal combustion engine. More specifically, the invention relates to an internal combustion engine capable of switching, during engine operation, between two combustion states in both of which combustion temperature and oxygen concentration differ greatly, respectively.

2. Description of Related Art

In general, various measures are taken with respect to a diesel engine, which is one type of a lean-burn internal combustion engine, so as to reduce emission of soot and nitrogen oxides (NOx). Such measures include, for example, a low-temperature combustion technology disclosed in the Japanese Patent Laid-Open Publication No. 2000-64911.

According to the low-temperature combustion technology disclosed in this Publication, a ratio of EGR gas contained in intake air subjected to combustion is controlled by increasing and reducing the amount of the EGR gas and air which flow into a combustion chamber, thereby enabling two engine combustion states, both of which combustion temperature and oxygen concentration differ greatly, respectively.

More specifically, in order to secure driveability during high-load operation, a normal combustion is carried out while regulating the ratio of the EGR gas contained in intake air to the appropriate value. On the other hand, during idling and low-load operation, the ratio of the EGR gas is significantly increased so as to significantly reduce the combustion temperature and the oxygen concentration, and the combustion state is switched into a so-called "low-temperature combustion" for reducing the amount of soot (smoke) and nitrogen oxides (NOx) generated.

Meanwhile, the diesel engine is operated under an excess air condition in which A/F reaches 30 to 40 in a normal combustion state, and thus a great amount of air (oxygen) remains in exhaust gas after the combustion. This means that a large amount of oxygen is also mixed in the EGR gas, or the exhaust gas.

Therefore, simply increasing the amount of the EGR gas only makes a slow change in the oxygen concentration and the amount of the EGR gas, and thus it may require some time to switch into the low-temperature combustion which is achieved at a high EGR rate. Furthermore, during the low-temperature combustion, the combustion state becomes unstable due to factors such as an increase in the EGR gas, or inert gas, and an engine output may also decrease. To deal with these conditions, various engine controls are used in general so as to reduce a time required for the switching and to secure a combustion stability.

More specifically, in addition to an opening angle control of an EGR valve, an opening angle control of an intake throttle valve, which significantly reduces the amount of air (oxygen) in the intake air by reducing the amount of air relative to the intake air, is carried out. Furthermore, an overshoot control is executed for switching the combustion state at an early stage by once overshooting the amount of the opening angle control of the EGR valve and the intake throttle valve. Meanwhile, a fuel injection system increases and corrects a fuel injection volume, and advances and corrects a fuel injection timing, such that misfire sue to the low-temperature combustion and a decrease in engine output are suppressed.

In the internal combustion engine as described above, switching of combustion state is optimized by performing various engine controls. The aforementioned engine controls are certainly required when returning to the normal combustion state. Processing of such controls are in accordance with the combustion state on each occasion.

One of general fuel injection technologies for diesel engines is a "pilot injection."

The pilot injection injects into a combustion chamber in advance some of the engine fuel to be injected for main injection, so as to create a heat source which serves as a pilot burner for the main combustion, thereby suppressing a sudden increase in a combustion pressure during the main combustion and a rise in the combustion temperature. That is, combustion becomes slow during the execution of the pilot injection, and thus combustion noise can be reduced and emission of harmful components (such as soot and nitrogen oxides NOx) contained in the exhaust gas can be suppressed.

Through the combined use of the low-temperature combustion and the pilot injection, generation of soot (smoke) and emission of nitrogen oxides (NOx) can be suppressed, and at the same time, the combustion noise can be reduced so as to achieve an environment for comfortable driving over the entire operation range.

Meanwhile, according to the inventors and the like of the invention, various improvements were made with respect to the combination of the low-temperature combustion and the pilot injection as mentioned above.

First, if the focus is laid on the low-temperature combustion, combustion becomes slow due to insufficient oxygen and a combustion pressure drop during the low-temperature combustion. As a result, the combustion noise can be reduced and the emission of harmful components can be suppressed as explained above. That is, the same effect obtained with the pilot injection can be obtained during the low-temperature combustion, and thus the pilot injection which has little influence on the engine output results in unnecessary fuel consumption.

Based on the foregoing explanations, it can not always be said that the pilot injection that has generally been executed is an effective fuel injection control technology for all operation ranges.

Furthermore, if the execution or non-execution of the pilot injection is determined upon a request for switching the combustion state, the combustion noise temporarily increases while the combustion state is switched, namely, during transition. That is, if the pilot injection is prohibited despite that the low-temperature combustion state is not yet established, the combustion noise that has been suppressed by the pilot injection is regenerated. Furthermore, if the pilot injection is restarted after the establishment of the normal combustion state, the combustion noise that has been suppressed by the low-temperature combustion temporarily increases during transition from the low-temperature combustion to the normal combustion.

Foregoing descriptions concludes that a key point in the development of an internal combustion engine that uses the low-temperature combustion together with the pilot injection is how to control a prohibited period of the pilot injection in order to achieve both the combustion noise reduction and the pilot injection prohibition.

SUMMARY OF THE INVENTION

It is an object of the invention to provide an internal combustion engine provided with an engine control technology capable of regulating pilot injection during low-temperature combustion and suppressing generation of combustion noise caused by prohibition of pilot injection.

To solve the technical problem stated above, the following structure was applied.

That is, an internal combustion engine according to an aspect of the invention has a combustion characteristic in which the amount of soot generated during combustion gradually reaches its peak when a ratio of inert gas contained in an air-fuel mixture subjected to combustion approaches a predetermined value, and if the ratio is further increased, the generation of soot is reduced. The internal combustion engine further includes a control unit for switching between a first combustion state in which generation of soot is restrained by suppressing the ratio of the inert gas below the predetermined value and a second combustion state in which generation of soot is restrained by maintaining the ratio of the inert gas above the predetermined value, and a fuel injection valve which stops execution of, in addition to main fuel injection for the internal combustion engine, the pilot injection which occurs prior to the main fuel injection during a predetermined period at least including a period of the second combustion state.

In the aspect as structured as above, the pilot injection is actively stopped during a period of the second combustion state in which a great amount of EGR gas exists and the combustion becomes slow. That is, the pilot injection is stopped during a period including the second combustion state in which combustion becomes slow, so as to avoid unnecessary fuel consumption due to execution of the pilot injection.

The predetermined period at least including the second combustion state according to the foregoing aspect may be a period defined only by a period of the second combustion state, and also assumes a case in which a part of the first combustion state is included. Furthermore, in the aforementioned aspect, the period of the second combustion state does not necessarily include an entire period of the second combustion state, and may be some period of the entire period of the second combustion state.

DETAILED DESCRIPTION OF PREFERRED EMBODIMENTS

A preferred embodiment of an internal combustion engine according to the invention will be described hereinafter. A structure of the internal combustion engine explained below is only one embodiment of the invention, and details of the structure can be modified according to each specification and the like of the internal combustion engine.

<Outline of a Diesel Engine>

Figure 1:
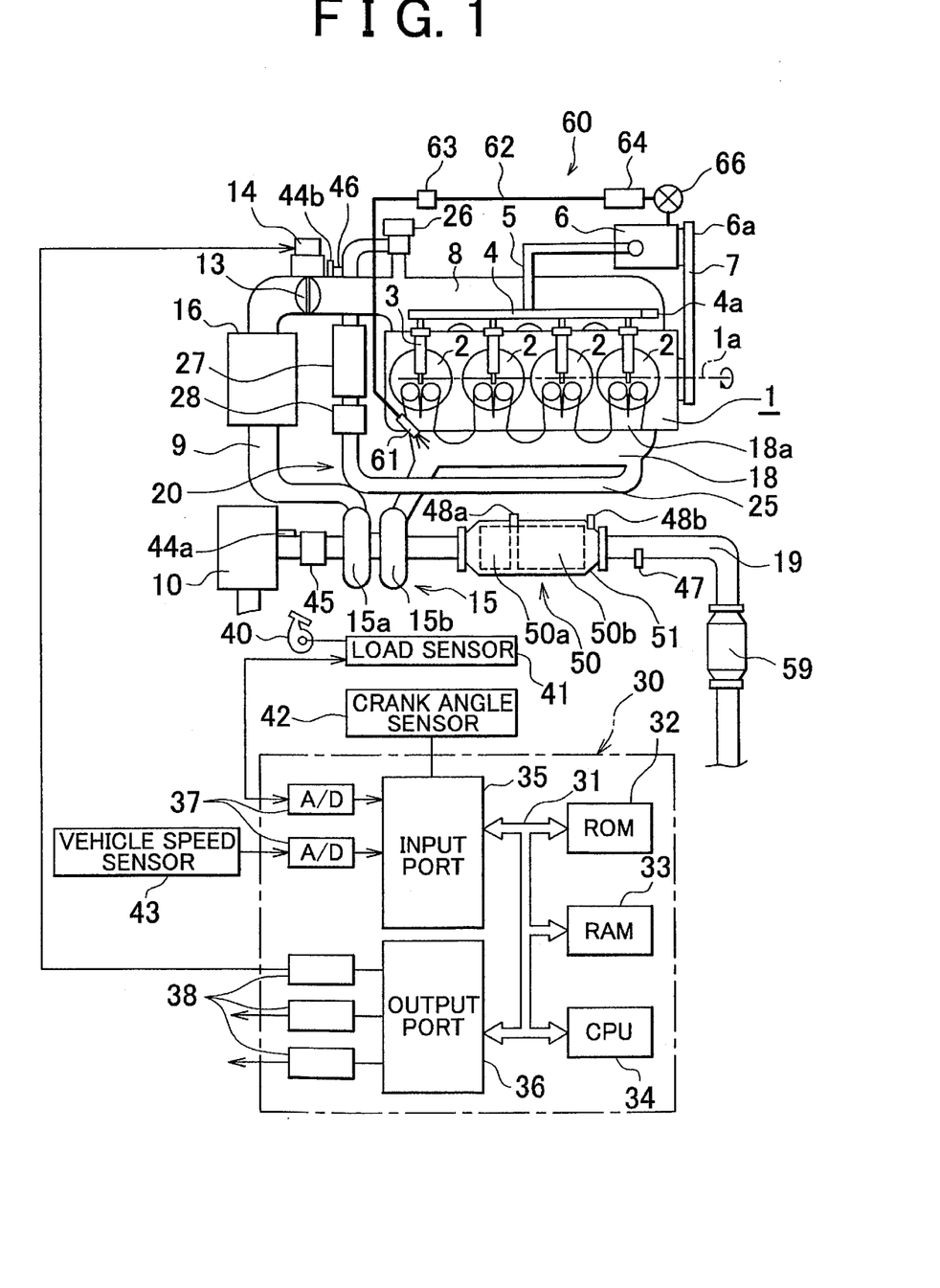
FIG. 1 is a schematic diagram of an internal combustion engine according to an exemplary embodiment.

An internal combustion engine 1 according to the embodiment of the invention is a diesel engine for a vehicle, which is one kind of a lean-burn internal combustion engine, and is equipped with, in addition to four cylinders 2 (combustion chambers) shown in FIG. 1, a fuel supply system, an intake system, an exhaust system, a control system, and the like as main components of the engine.

The fuel supply system has a fuel injection valve 3, a common rail (accumulator) 4, a fuel supply pipe 5, a fuel pump 6, and the like, and supplies fuel to each cylinder 2. The fuel injection valve 3 is an electromagnetically driven open/close valve provided for each cylinder 2. Each fuel injection valve 3 is connected to the common rail 4 which serves as a fuel distribution pipe. Furthermore, the common rail 4 is connected to the fuel pump 6 via the fuel supply pipe 5. The fuel pump 6 is rotated and driven by using rotation of a crankshaft 1a, or an output shaft of the internal combustion engine 1, as a drive source.

In the fuel supply system as structured as above, fuel in a fuel tank (not shown) is at first pumped up by the fuel pump 6. The pumped fuel is supplied to the common rail 4 via the fuel supply pipe 5. A pressure of the fuel supplied to the common rail 4 is increased to a predetermined fuel pressure within the common rail 4, and then is distributed to each fuel injection valve 3. Then, as a drive voltage is applied to the fuel injection valve 3 to open the valve 3, the fuel is injected into each cylinder 2 through the fuel injection valve 3.

Meanwhile, the intake system has an intake pipe 9, a throttle valve 13, an intake branch pipe 8, an air cleaner box 10, an intercooler 16, and the like, to form an intake passage for supplying air to each cylinder 2.

The intake pipe 9 forms a passage for introducing air taken in through the air cleaner box 10 to the intake branch pipe 8. The intake branch pipe 8 forms a passage for distributing the air flowed in through the intake pipe 9 to each cylinder 2. Furthermore, in the vicinity of a connecting portion between the intake pipe 9 and the air cleaner box 10 is provided with an intake temperature sensor 44a for measuring a temperature of the air flowed into the intake pipe 9.

Moreover, the intake pipe 9, which runs from the air cleaner box 10 to the throttle valve 13, is provided with a turbocharger 15 (compressor housing 15a) for compressing intake air, and the intercooler 16 for cooling the air compressed by the turbocharger 15. Furthermore, in the upstream of the turbocharger 15 is provided with an air flow meter 45 for measuring a flow rate of the air flowed into the combustion chambers through the intake pipe 9.

Moreover, in the direct upstream of the intake branch pipe 8 is provided with the throttle valve 13 (air volume controller) for increasing and decreasing the amount of air flowed into each cylinder 2 through the intake pipe 9. An opening angle of the throttle valve 13 is controlled by an actuator 14 which is comprised of a step motor and the like. Meanwhile, in the direct downstream of the throttle valve 13 is provided with an intake temperature sensor 44b for measuring a temperature in the intake branch pipe 8, and an intake pressure sensor 46 for measuring a pressure in the intake branch pipe 8.

In the intake system as structured as above, air that is to be supplied to each cylinder 2 at first flows into the air cleaner box 10 due to of vacuum caused by engine operation. In the air cleaner box 10, dust is removed from the air, and then the air flows into the turbocharger 15 through the intake pipe 9. The air flowed into the turbocharger 15 is compressed by a compressor wheel 15a, and then cooled by the intercooler 16. Thereafter, the airflow is controlled by the throttle valve 13 as necessary, and the air then flows into the intake branch pipe 8. The air flowed into the intake branch pipe 8 is distributed to each cylinder 2 via each branch pipe, and is burned with fuel injected and supplied from the fuel injection valve 3. Meanwhile, an output of each sensor is input to an electronic control unit 30 which is described below, and is fed back, for example, to a basic fuel injection control of the internal combustion engine.

The exhaust system has an exhaust branch pipe 18 and an exhaust pipe 19 to form an exhaust passage for discharging exhaust gas exhausted from each cylinder 2 outside the engine unit. In addition, the exhaust system is provided with a catalytic converter 50, a reducer application device 60, an EGR system 20, and the like so as to function as an exhaust purifying system for purifying nitrogen oxides (NOx) and particulate matter (such as soot) contained in the exhaust gas.

The exhaust branch pipe 18 is connected to an exhaust port 18a provided for each cylinder 2, and forms a passage for gathering the exhaust gas discharged from the exhaust port 18a and introducing such gas into a turbine housing 15b of the turbocharger 15. Meanwhile, the exhaust pipe 19 forms a passage from the turbine housing 15b to a muffler (not shown). A numerical symbol 59 in FIG. 1 is a widely-known oxidation catalytic converter.

The catalytic converter 50 is provided with a casing 51, and exhaust purifying catalysts 50a, 50b arranged inside the casing 51, and has an exhaust purifying operation for purifying harmful substances in the exhaust gas discharged from the engine unit 1.

More specifically, the casing 51 is disposed in the vicinity of an outlet of the turbine housing 15b, and the exhaust purifying catalysts are arranged inside the casing 51 with a NOx storage reduction catalyst 50a in the upper stream side than a particulate filter 50b, so as to constitute the catalytic converter 50. In the descriptions hereinafter, the NOx storage reduction catalyst 50a may simply be referred to as a lean NOx catalyst 50a.

The lean NOx catalyst 50a, which is one kind of the exhaust purifying catalyst, has an exhaust purifying operation for mainly purifying nitrogen oxides (NOx) in the exhaust gas. More specifically, the lean NOx catalyst 50a has the exhaust purifying operation as follows. That is, when the oxygen concentration in the exhaust gas which flows into the lean NOx catalyst 50a is high, nitrogen oxides (NOx) in the exhaust gas is absorbed, while when the oxygen concentration in the exhaust gas is low, namely, when an air-fuel ratio of the exhaust gas which flows into the lean NOx catalyst 50a is low, the absorbed nitrogen oxides (NOx) is reduced and discharged into the exhaust gas in the form of nitrogen dioxide ($NO_2$) and nitrogen monoxide (NO). At the same time, the nitrogen dioxide ($NO_2$) and the nitrogen monoxide (NO) are oxidized by reacting with unburned fuel composition (CO, HC) contained in the exhaust gas, and therefore be purified into harmless vapor ($H_2O$) and carbon dioxide ($CO_2$).

Furthermore, a structure of the lean NOx catalyst 50a is such that, for example, an alumina ($Al_2O_3$) is used as a carrier, and a precious metal such as platinum (Pt), and at least one of alkali metal such as kalium (K), sodium (Na), lithium (Li), and cesium (Cs), alkaline earth such as barium (Ba) and calcium (Ca), and rare earth such as lanthanum (La) and yttrium (Y) are supported on the carrier.

To supplement the explanations of the exhaust purifying operation, in the lean-burn internal combustion engine 1 according to the embodiment of the invention, combustion is normally carried out in an excess oxygen atmosphere. Therefore, the oxygen concentration in the exhaust gas discharged due to the combustion is seldom reduced to a level enough to facilitate the aforementioned reduction and discharge operation. Moreover, the amount of the unburned fuel composition (CO, HC) contained in the exhaust gas is extremely small.

Consequently, according to this embodiment, engine fuel (HC), or a reducer, is injected and supplied into the exhaust gas, so as to facilitate reduction of the oxygen concentration and supplement hydrocarbon (HC) or the like, which is unburned fuel composition, thereby accelerating the exhaust purifying operation. Furthermore, the reducer is injected and supplied by the reducer application device 60 whose details are explained later.

On the other hand, the particulate filter 50b has an exhaust purifying operation for oxidizing and burning particulate matter such as soot contained in the exhaust gas. More specifically, the particulate filter 50b is provided with a filter 58 which carries an active oxygen emitting agent, and has the exhaust purifying operation to oxidize and burn particulate matter collected by the filter 58, thereby removing (purifying) such particulate matter.

Figure 2:
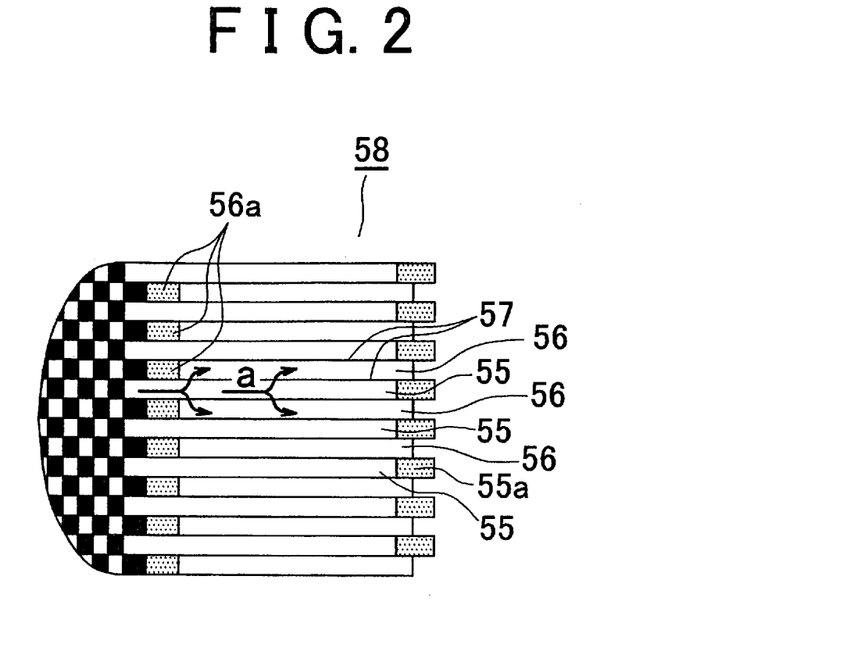
FIG. 2 is a diagram illustrating an internal structure of a particulate filter which is one kind of an exhaust emission control catalyst.

A unit of the filter 58 is, as shown in FIG. 2, made into a honeycomb shape formed by a porous material such as cordierite, and is provided with a plurality of passages 55, 56 extending in parallel with each other. More specifically, the filter 58 has an exhaust gas inflow passage 55 whose downstream end is clogged by a plug 55a, and an exhaust gas outflow passage 56 whose upstream end is clogged by a plug 56a. The exhaust gas inflow passage 55 and the exhaust gas outflow passage 56 are arranged side by side in longitudinal and lateral directions of the filter 58 via a thin partition wall 57.

Furthermore, a carrier layer formed by alumina ($Al_2O_3$) and the like is provided on a pore on a surface of and inside the partition wall 57. On the carrier is supported, in addition to a precious metal catalyst such as platinum (Pt), the active oxygen emitting agent which stores excess oxygen in a case when excess oxygen exists in the surroundings, while discharges the stored oxygen in the form of active oxygen in a case when the oxygen concentration is reduced.

As the active oxygen emitting agent, at least one of the following may preferably be used: alkali metal such as kalium (K), sodium (Na), lithium (Li), cesium (Cs), and rubidium (Rb); alkaline earth metal such as barium (Ba), calcium (Ca), and strontium (Sr); rare earth such as lanthanum (La) and yttrium (Y); and transition metal such as cerium (Ce) and tin (Sn).

Furthermore, it is preferable to use alkali metal or alkaline earth metal, which have high ionicity compared to calcium (Ca), that is, kalium (K), lithium (Li), cesium (Cs), rubidium (Rb), barium (Ba), strontium (Sr), and the like.

In the particulate filter 50b as structured as above, exhaust gas flows from the exhaust gas inflow passage 55 to the partition wall 57, and then to the exhaust gas outflow passage 56 (gas flow indicated by an arrow a in FIG. 2). Particulate matter such as soot contained in the exhaust gas is, while it passes through the partition wall 57, collected on the surface of or inside the partition wall 57. Then, the particulate matter collected by the partition wall 57 is oxidized by active oxygen which is increased by changing over several times the oxygen concentration in the exhaust gas flowing into the partition wall 57 (filter). Eventually, the particulate matter is burned out without generating a luminous flame and is removed from the filter 58.

According to this embodiment as described above, nitrogen oxides (NOx) and particulate matter such as soot contained in the exhaust gas are purified by arranging the NOx storage reduction catalyst 50a and the particulate filter 50b in the exhaust passage.

Moreover, in this embodiment, the NOx storage reduction catalyst 50a and the particulate filter 50b are arranged in series as mentioned above. Reasons for this arrangement includes that the particulate filter 50b is warmed up by utilizing a reaction heat caused by oxidation and reduction reactions in the NOx storage reduction catalyst 50a, and that active oxygen discharged from the NOx storage reduction catalyst 50a due to oxidation and reduction reactions in the NOx storage reduction catalyst 50a is utilized in the exhaust purifying operation of the particulate filter 50b. Furthermore, it is apparent from the foregoing descriptions that the NOx storage reduction catalyst 50a carries substantially the same substance as the active oxygen emitting agent. Consequently, it can be said that the NOx storage reduction catalyst 50a has a function as the active oxygen emitting agent.

Next, descriptions will be given of the reducer application device 60 for facilitating the exhaust purifying operation of the exhaust purifying catalyst.

The reducer application device 60 is provided with a reducer application valve 61, a reducer supply passage 62, a fuel pressure control valve 64, a fuel pressure sensor 63, an emergency shut-off valve 66, and the like, and applies an appropriate amount of a reducer (engine fuel) to the exhaust passage in the upstream of the catalytic converter 50, as necessary. That is, the engine fuel, or the reducer, is supplied into the exhaust gas such that an air-fuel ratio of the exhaust gas flowing into the catalytic converter 50 becomes a target air-fuel ratio.

The reducer application valve 61 is provided at a junction portion of the exhaust branch pipe 18, and is an electric open/close valve which opens when a predetermined voltage is applied. The reducer supply passage 62 forms a passage for introducing some of the fuel pumped up by the fuel pump 6 to the reducer application valve 61. The fuel pressure control valve 64 is disposed at a point along the reducer supply passage 62, and maintains the fuel pressure in the reducer supply passage 62 at a predetermined fuel pressure. The fuel pressure sensor 63 detects the fuel pressure in the reducer supply passage 62. The emergency shut-off valve 66 stops fuel supply to the reducer supply passage 62 when abnormality occurs in a pressure in the reducer supply passage 62.

In the reducer application device 60 as structured as above, fuel discharged from the fuel pump 6 is maintained at the predetermined fuel pressure by the fuel pressure control valve 64, and is supplied to the reducer application valve 61 through the reducer supply passage 62. Next, when the predetermined voltage is applied to the reducer application valve 61, the reducer application valve 61 opens, and the fuel in the reducer supply passage 62 is injected and supplied to the exhaust branch pipe 18 via the reducer application valve 61. The fuel (reducer) supplied to the exhaust branch pipe 18 flows into the catalytic converter 50 through the exhaust pipe 19 after being agitated in the turbine housing 15b. This means that the exhaust gas which has low oxygen concentration and is mixed with hydrocarbon (HC), or an unburned fuel composition, is flowed into the catalytic converter 50, thereby facilitating the aforementioned exhaust purifying operation.

The amount of reducer applied and an application timing are determined in consideration of an output from an air-fuel ratio sensor (A/F sensor) 47 provided in the downstream of the catalytic converter 50, an output from exhaust gas temperature sensors 48a, 48b provided in the upstream and downstream of the particulate filter 50b, an operation history recorded in the electronic control unit 30 which is described later, and the like.

Next, descriptions will be given of the EGR system 20.

The EGR system 20 corresponds to an EGR gas volume controller according to the invention, and is provided with an EGR passage 25, an EGR valve 26, a oxidation catalyst 28 for the EGR system 20, an EGR cooler 27, and the like.

The EGR passage 25 is a passage which connects the exhaust branch pipe 18 and the intake branch pipe 8. The EGR valve 26 is an electric open/close valve disposed at a connecting portion between the EGR passage 25 and the intake branch pipe 8, and regulates the amount of exhaust gas (EGR gas) which flows in the EGR passage 25 based on a combustion state switching control program processed in the electronic control unit 30, and the like. The oxidation catalyst 28 for the EGR system 20 is disposed in the EGR passage 25 which connects the exhaust branch pipe 18 and the EGR cooler 27, and purifies an unburned fuel composition in the exhaust gas, or the EGR gas, that enters from the exhaust branch pipe 18. The EGR cooler 27 cools the exhaust gas that flows in the EGR passage 25 by using an engine coolant as a heating medium. In the descriptions hereinafter, the exhaust gas which flows into the intake branch pipe 8 through the EGR passage 25 may simply be referred to as the EGR gas.

According to the EGR system as structured as above, some of exhaust gas flowing in the exhaust branch pipe 18 flows into the EGR passage 25 at a flow rate corresponding to a valve opening angle of the EGR valve 26. Furthermore, the EGR gas (exhaust gas) flowed into the EGR passage 25 flows into the EGR cooler 27 through the oxidation catalyst 28 for the EGR system 20. The EGR gas flowed into the EGR cooler 27 is cooled as it passes the EGR cooler 27 and flows into the intake branch pipe 8. Then, the EGR gas flowed into the intake branch pipe 8 is mixed with air (new air) which flows in from the upstream of the intake branch pipe 8 to form intake air, and is burned with fuel injected from the fuel injection valve 3. That is, in this embodiment, an air-fuel mixture according to the invention is made up of an gas mixture of the air (new air) and the EGR gas.

Moreover, the exhaust gas which will serve as the EGR gas contains inert gas such as vapor ($H_2O$) and carbon monoxide ($CO_2$). Therefore, when the exhaust gas, or the inert gas, flows into the combustion chamber 2, a combustion temperature decreases due to entry of the exhaust gas, thereby suppressing generation of nitrogen oxides (NOx). In addition, introduction of the EGR gas causes reduction in the amount of oxygen in the combustion chamber 2, thus suppressing bonding between nitrogen oxides (NOx) and oxygen ($O_2$). As a result, emission of nitrogen oxides (NOx) is suppressed.

Next, descriptions will be given of the control system.

The control system is a so-called electronic control unit 30 (ECU), which is provided with a ROM (Read Only Memory) 32, a RAM (Random Access Memory) 38, a CPU (Central Processing Unit) 34, an input port 35, and an output port 36, all these elements being connected with each other by a two-way bus 31.

To the input port 35, in addition to an output signal from each sensor mentioned above, output signals from sensors such as a load sensor 41 for detecting an amount of travel of an accelerator pedal 40, a crank angle sensor 42 for detecting a rotation speed of the crankshaft 1*a*, and a vehicle speed sensor 43 for measuring a vehicle speed are input directly or via a corresponding A/D converter 37. On the other hand, the output port 36 is connected, via a corresponding drive circuit 38, with the fuel injection valve 3, the reducer application valve 61, the actuator 14 for driving throttle valve, the EGR valve 26, and the like.

Furthermore, in the ROM 32 is recorded a control program for each system, a control map to be referred to during processing of the control program, and the like, according to each system. Meanwhile, an output signal from each sensor that is input to the input port 35, a control signal output to the output port 36, and the like are recorded in the RAM 33 as an operation history of the internal combustion engine. The CPU 34 compares, using a desirable program, an output signal from each sensor recorded in the RAM 33, the control map developed in the ROM 32, and the like, and outputs each control signal which is output during the comparison process to a corresponding system via the output port 36, in order to centrally control each system.

Next, descriptions will be given of the combustion state switching control processed in the electronic control unit 30 as mentioned above.

<Combustion State Switching Control>

Prior to explaining details of the processing of the control, a combustion characteristic of the internal combustion engine is first explained.

The diesel engine according to the embodiment is one kind of the internal combustion engine disclosed in the preceding material. The diesel engine adopts a combustion technology by which a ratio of inert gas to intake air (air-fuel mixture) subjected to combustion is significantly increased, so as to suppress development of smoke generated during the combustion.

Figure 3:
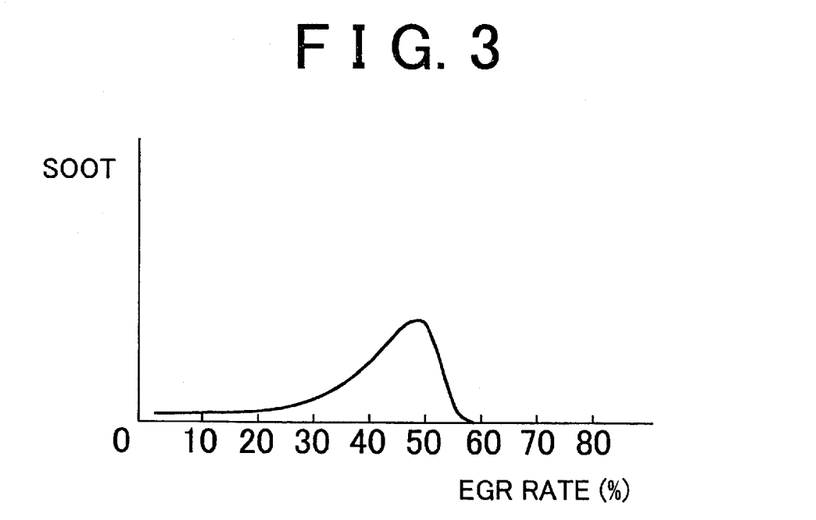
FIG. 3 is a graph illustrating a correlation between the amount of soot generated and an EGR rate.

FIG. 3 is a graph obtained based on the results of an actual experiment, and shows a correlation between the ratio of inert gas to intake air, and the amount of smoke generated by the combustion of such gases. In the following descriptions, the ratio of inert gas to intake air may simply be referred to as an EGR rate.

As FIG. 3 indicates, the amount of soot generated reaches its peak at the EGR rate of about between 40% and 50%, and the soot is hardly generated in a range of the EGR rate of 55% or above. Therefore, the engine can be operated with the amount of soot emission kept at approximately zero if the engine is operated in the range of the EGR rate of 55% or above, preferably 65% or above. Furthermore, the EGR rate at which the amount of soot emission becomes approximately zero can be lowered by cooling the RGR gas by the EGR cooler 27 and the like.

Nevertheless, when the engine is operated with the EGR rate of 65% or above, there arises a problem that a sufficient engine output can not be obtained due to insufficient air or a decrease in a combustion pressure. On the other hand, in a range of the EGR rate below 40% in which the sufficient engine output can be obtained, soot is generated by a slight amount. However, the amount of soot generated is quite less than that generated in the operation range of the EGR rate of 40% to 50%.

Therefore, the engine is operated with the EGR rate kept at 65% or above in an operation state in which the engine output is not so required such as during idling and low-load operation. On the other hand, the engine is operated with the EGR rate suppressed below 40% when a sufficient engine output is required such as during high-load operation. By these operations, a comfortable operation state is secured while suppressing generation of soot.

That is, in the diesel engine according to this embodiment, the combustion state is switched in steps to avoid the operation at the EGR rate of between 40% and 50% in which the amount of soot generated reaches its peak, thereby securing a driveability and suppressing soot emission at the same time. Furthermore, the first combustion state and the second combustion state according to the invention are switched as described above.

Values indicated above as examples, or the specific values of the EGR rate, represent only one example, and the values vary slightly according to a combustion characteristic peculiar to a relevant internal combustion engine and a cooling temperature of the EGR gas. However, an emission characteristic of soot, that is, existence of the peak, and the like are common to all internal combustion engines. In addition, the first combustion state according to the invention is a combustion state which is achieved at a low EGR rate as mentioned above, and, on the other hand, the second combustion state corresponds to a combustion state achieved at a high EGR rate.

Switching of the combustion state is determined in consideration of, for example, a required engine torque calculated in processing of the basic fuel injection control, which is one kind of an engine control. In other words, as one control of the combustion state switching control, the combustion state is switched by carrying out, for example, a combustion state selection control in which an operation at the EGR rate of 65% or above is selected when the required engine torque becomes a predetermined lower limit value or lower, and an operation at the EGR rate below 40% is selected when the required engine torque reaches a predetermined upper limit value or higher.

A hysteresis is provided between the predetermined upper limit value and the predetermined lower limit value. The hysteresis suppresses frequent switching of the combustion state, and, for example, makes switching threshold values for an acceleration operation different from that for an deceleration operation, thereby suppressing frequent switching of the combustion state in the vicinity of those threshold values.

Next, descriptions will be given of details of the processing of the combustion state switching control (combustion state switching control program).

In the following descriptions, an engine operation at the EGR rate of 65% or above may be referred to as a "low-temperature combustion" and an engine operation at the EGR rate below 40% may be referred to as a "normal combustion."

Furthermore, in this control, the combustion state is switched by executing an engine control such as, in addition to the aforementioned combustion state selection control, an EGR rate variable control which changes an opening angle of the EGR valve 26 and the throttle valve 13 so as to change the EGR rate, and a fuel injection correction control which stabilizes the combustion state and the engine output by switching to a fuel injection control suitable for each combustion state.

That is, the combustion state switching control according to the embodiment corresponds to the combustion state switching system according to the invention, and is a control which comprehensively processes the opening angle control of the EGR valve 26, the opening angle control of the throttle valve 13, the fuel injection correction control, and the like. Furthermore, by controlling the EGR valve 26, the throttle valve 23, and the basic fuel injection control of the internal combustion engine based on each of these controls, the EGR gas volume controller, the air volume controller, injection volume correction, injection timing correction, and the like according to the invention are achieved.

The basic fuel injection control referred above is a control which controls the fuel injection valve 3 and the fuel pump 6 based on the fuel injection volume, the fuel injection timing, the fuel injection pressure, and the like calculated using parameters such as an engine revolution speed and a required load, so as to inject and supply to each combustion chamber 2 an appropriate amount of fuel according to each operation condition at an appropriate fuel injection timing. In other words, the fuel injection control according to the invention is configured as one control of the basic fuel injection control as described above.

Figure 4:
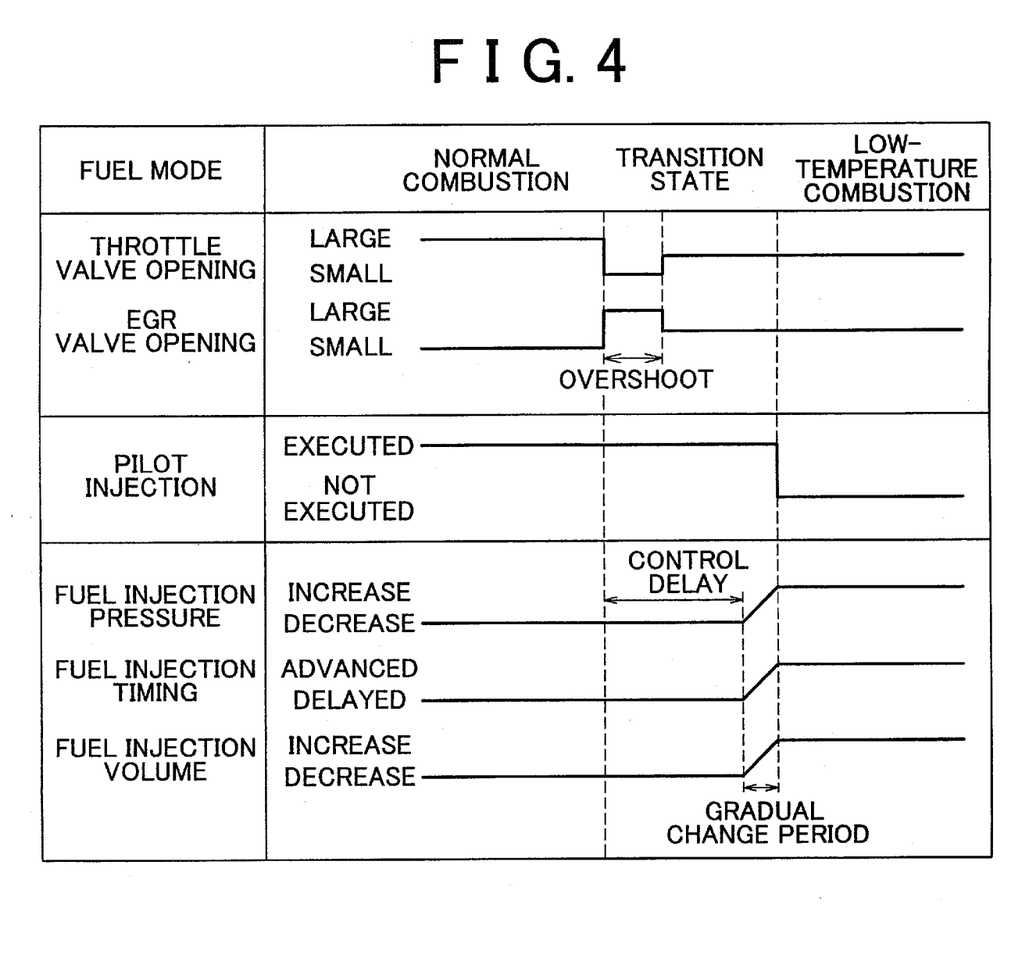
FIG. 4 is a time chart showing a time-based change in each control that is processed when switching from a normal combustion to a low-temperature combustion.
Figure 5:
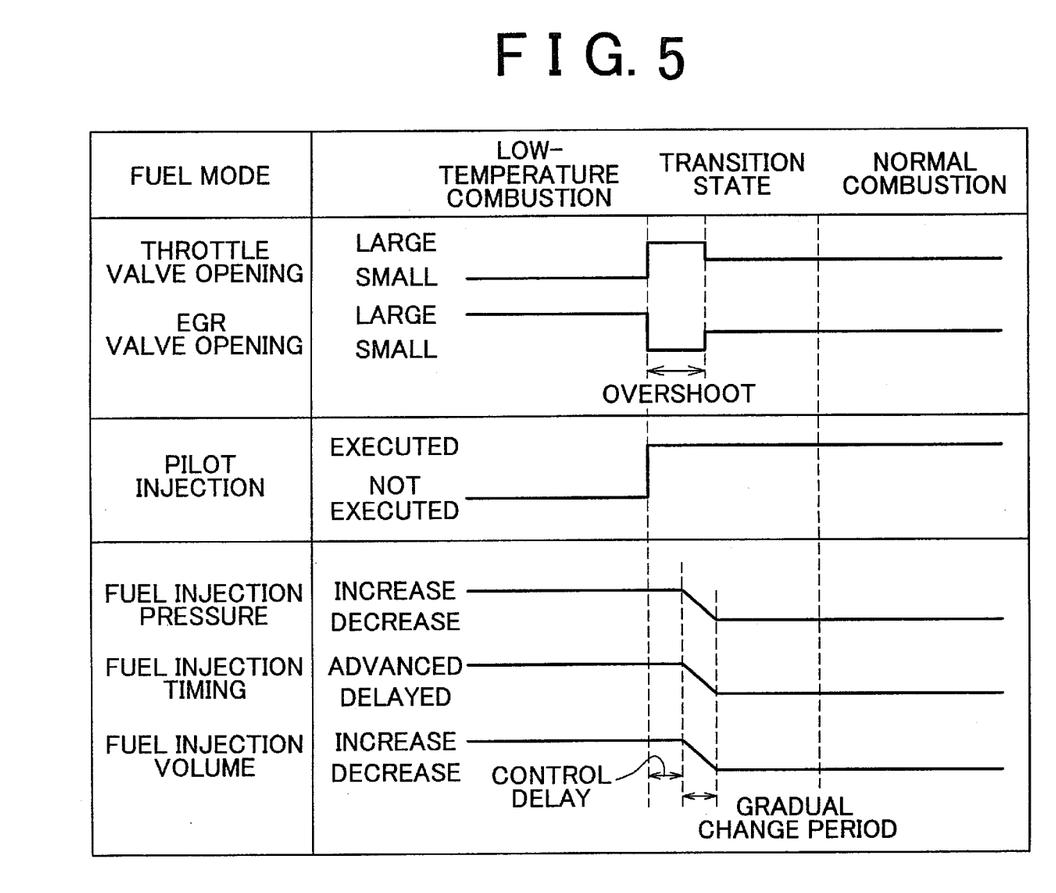
FIG. 5 is a time chart showing a time-based change in each control that is processed during transition from the low-temperature combustion to the normal combustion.

FIG. 4 and FIG. 5 show time-based changes that occur in a processing of the combustion state switching control, with respect to an opening angle of the EGR valve 26, an opening angle of the throttle valve 13, a fuel injection volume, a fuel injection timing, and the like, according to each combustion state.

Hereinafter, with reference to FIG. 4 and FIG. 5, each control that is processed in a process of switching of the combustion state will be explained in detail.

Referring to FIG. 4, descriptions will first be given of the control to be processed when switching from the normal combustion to the low-temperature combustion.

To switch the normal combustion to the low-temperature combustion, a combustion state at the EGR rate below 40% is switched into the combustion state at the EGR rate of 65% or above. That is, the EGR rate variable control for increasing the EGR rate by reducing the opening angle of the throttle valve 13 while increasing the opening angle of the EGR valve 26 is executed.

Furthermore, the EGR rate variable control controls the opening angle of each valve 26, 13 based mainly on an air-fuel ratio (oxygen concentration) of the exhaust gas which flows in the exhaust passage. More specifically, an output of the air-fuel ratio sensor 47 provided at the downstream of the catalytic converter 50 is fed back, and the opening angles of the EGR valve 26 and the throttle valve 13 are feedback-controlled such that a predetermined output is obtained with the air-fuel ratio sensor 47.

The predetermined output referred above is a value output when a ratio of inert gas to intake air (EGR rate) reaches a target ratio, and is defined by, for example, a relation between an EGR rate obtained by each preliminary experiment and oxygen concentration in exhaust gas.

Moreover, with respect to the EGR rate variable control, the combustion state switching control executes an overshoot control which forcibly changes the EGR rate in preference to the feedback control based on the output from the air-fuel ratio sensor 47.

That is, because the amount of the EGR gas supplied and the air flow change over time lagging behind the controls of each valve 26, 13, an amount of control of each valve 13, 26, that is supposed to be determined based on the target ratio (EGR rate) required in the low-temperature combustion, is temporarily increased, so as to shorten a response speed (change speed) of the EGR rate. Furthermore, in the processing of the overshoot control according to this embodiment, the EGR valve 26 is set in a substantially full-open state and the throttle valve 13 is set in a substantially full-closed state, thereby improving the response speed of the EGR rate. The overshoot control is achieved as described above in this embodiment.

After the processing of the overshoot control, the feedback control of the EGR valve 26 or the feedback control of the throttle valve 13 is started when the oxygen concentration in the exhaust gas is reduced to a predetermined value and when the air flow rate obtained by the output from the air flow meter 45 is reduced to a predetermined value.

Meanwhile, the fuel injection correction control carries out corrections such as increasing a fuel injection pressure, increasing a fuel injection volume, and advancing a fuel injection timing. The content of these corrections is recorded in the electronic control unit 30 as the fuel injection control for the low-temperature combustion. Thus, when switching to the low-temperature combustion, the basic fuel injection control thereafter is processed based on the fuel injection control for the low-temperature combustion.

The purpose of correction of the basic fuel injection control is to ameliorate various combustion problems caused in the low-temperature combustion. That is, in the low-temperature combustion, the combustion temperature and the combustion pressure are reduced and the amount of oxygen subjected to the combustion is also reduced, thus establishing a slow combustion state. Accordingly, the fuel injection control executed during the normal combustion causes problems such as misfire, combustion pressure drop, insufficient engine output. To deal with these problems, various corrections mentioned above are conducted to optimize amelioration of ignition delay, shortening of a direct combustion period and a late combustion period, and the like, so as to obtain a favorable combustion state during the low-temperature combustion. The aforementioned corrections are relative to the fuel injection control during the normal combustion, and thus do not suggest that, for example, the amount of fuel injected during the low-temperature combustion substantially exceeds the amount of fuel injected during the normal combustion.

Moreover, according to this embodiment, switching of the fuel injection control is processed after the EGR rate variable control. That is, a fuel injection restraint control which restrains, after switching of the combustion state is started, the fuel injection control in a control state prior to the switching for a predetermined time is executed.

More specifically, the basic fuel injection control is optimized by incorporating a control delay (stand-by time) in the corrections of the fuel injection control so as to deal with a delay in response of the EGR gas volume and the air volume.

A delay time in the corrections is determined in considerations of various conditions. More specifically, the delay time is determined in consideration of the conditions such as a time until an integrated number of crank cycles from the start of the combustion state switching reaches a predetermined number of crank cycles, a time until an air volume, a pressure in the intake branch pipe, and a temperature in the intake branch pipe reach a predetermined value, and the amount of fuel injection prior to the combustion state switching. When these conditions are satisfied, the corrections of the fuel injection control is started.

The integrated number of crank cycles referred above corresponds to a state of progress in a process of intake, compression, combustion and exhaust. By detecting the integrated number of crank cycles, the amount of exhaust gas (EGR gas) entering in the intake system, that is, the EGR rate, can generally be predicted. Furthermore, to give explanations on changes in the air volume, the pressure in the intake branch pipe, and the temperature in the intake branch pipe, the air volume and the pressure in the intake branch pipe decreases during the low-temperature combustion, while the temperature in the intake branch pipe increases. Accordingly, detecting theses changes enables prediction of the EGR rate. Moreover, since the amount of the exhaust gas (EGR gas) is determined by the fuel injection volume prior to the combustion state switching, the amount of the EGR gas entering can be predicted based on the fuel injection volume.

In the internal combustion engine according to the embodiment, a change in the EGR rate, that is, whether or not a ratio of the EGR gas in the intake air supplied for combustion reached a predetermined ratio is determined. When the ratio reaches the predetermined ratio, the corrections of the fuel injection volume, the fuel injection timing, and the like by the fuel injection correction control are started.

In addition, in this embodiment, a gradual change control is carried out with respect the correction of the basic fuel injection control. In other words, since the correction related to fuel injection has a significant influence on the engine output and combustion state stability, each correction item is changed in a gradual manner, so as to avoid a torque shock and the like during the fuel injection correction control.

Next, referring to FIG. 5, descriptions will be given of the details of the control to be processed when returning from the low-temperature combustion to the normal combustion.

In switching from the low-temperature combustion to the normal combustion, a combustion state with the EGR rate of 65% or above is switched into a combustion state with the EGR rate below 40%. That is, the EGR rate variable control for reducing the EGR rate by reducing the opening angle of the EGR valve 26 while increasing the opening angle of the throttle valve 13 is executed.

Furthermore, also in switching from the low-temperature combustion to the normal combustion, the feedback control based on the air-fuel ratio (oxygen concentration) of exhaust gas flowing in the exhaust passage is carried out in the EGR rate variable control. Moreover, the overshoot control of each valve 13, 26 is executed prior to the feedback control. In the overshoot control executed when switching into the normal combustion, the EGR valve 26 is set in a substantially full-closed state and the throttle valve 13 is set in a substantially full-open state.

Meanwhile, in the fuel injection correction control, a recovery correction such as reducing the fuel injection pressure, reducing the fuel injection volume, and delaying the fuel injection timing is carried out, so as to return each item corrected in the low-temperature combustion to a normal value. Furthermore, by executing the gradual change control at the start of the correction of the fuel injection control, the torque shock and the like caused with switching of the fuel injection control are avoided. Moreover, in the embodiment, also in the recovery correction of the fuel injection control caused by switching into the normal combustion, a control delay (stand-by time) is incorporated in the correction so as to deal with a delay in response of the EGR gas volume and the air volume, thereby optimizing the fuel injection control. Setting of a delay time is determined in consideration of the conditions stated above.

In the internal combustion engine according to the embodiment as described above, various problems caused with the combustion state switching is ameliorated by processing, during transition of the combustion state, an additional control such as executing the overshoot control for overshooting an amount of control of each valve 13, 26, executing the fuel injection restraint control in which the control delay is incorporated in the correction of the fuel injection control, and executing the gradual change control when switching the fuel injection control.

That is, the combustion state is promptly switched by the overshoot control, and thus a combustion unstable state during transition that is caused by a delay in response of the EGR gas volume and the air volume is ameliorated. Furthermore, the fuel injection control is optimized by incorporating the control delay in the correction of the fuel injection control and executing the gradual change control. As a result, driveability improvement, combustion noise reduction, smoke suppression, and the like can be achieved.

Meanwhile, the diesel engine according to the embodiment has a sub-injection, or a so-called "pilot injection," which is executed prior to a main fuel injection (hereinafter called the main injection) of the internal combustion engine, carried out as one control of the basic fuel injection control.

The pilot injection injects some of the engine fuel, which is injected for the main injection, into the combustion chamber 2 in advance so as to create a heat source which serves as a pilot burner for the main combustion, thereby suppressing a sudden rise in the combustion pressure and the combustion temperature during the main combustion. That is, execution of the pilot injection makes the combustion slow, thus reducing the combustion noise and suppressing generation of nitrogen oxides (NOx) and the like. Moreover, ignitability of the fuel injected for the main injection improves, and generation of soot is suppressed.

Nevertheless, the diesel engine 1 according to the embodiment in some cases has the engine operated with the combustion state switched into the low-temperature combustion in which the combustion becomes slow. In such case, as is the case when the pilot injection is executed, reduction of the combustion noise and suppression of emission of harmful substances are achieved. In consequence, since the pilot injection which has only a little affect on the engine output leads to an increase in the fuel consumption, and the like, execution of the pilot injection may preferably be avoided as much as possible.

However, if execution or non-execution of the pilot injection is simply determined in response to a request for the combustion state switching, there arises a problem such as the combustion noise being increased temporarily due to prohibition of the pilot injection. Therefore, in the internal combustion engine according to the embodiment, a period for executing the pilot injection is appropriately controlled according to various conditions, thereby achieving both prohibition of the pilot injection and suppression of the combustion noise. That is, a pilot injection control which appropriately restricts execution of the pilot injection is processed together with the combustion state switching control, and thus both prohibition of the pilot injection and suppression of the combustion noise are achieved. Hereinafter, the pilot injection control will be explained.

At first, the pilot injection control to be processed in switching to the low-temperature combustion is explained referring to a time chart shown in FIG. 4.

In switching to the low-temperature combustion, the pilot injection is prohibited after the overshoot control which is executed in the combustion state switching control and after the fuel injection correction control.

That is, because an excessive amount of oxygen still remains in the combustion chamber 2 prior to the overshoot control, it can be said that it is in a state in which combustion noise, smoke, and the like are more likely to be generated. Therefore, in the pilot injection control, the prohibition of the pilot injection is held on stand-by until the amount of oxygen in the combustion chamber 2 is sufficiently reduced, so as to prevent a temporary increase of the combustion noise caused by the early prohibition of the pilot injection. In other words, the pilot injection is continued until the amount of oxygen in the combustion chamber 2 is sufficiently reduced.

Furthermore, when switching to the second combustion state, the pilot injection is prohibited after once overshooting the amount of control of the EGR gas volume and the air volume. That is, the EGR gas volume and the air volume are actively changed so as to achieve an early switching of the combustion state, and the pilot injection is prohibited upon establishment of the second combustion state. As a result, the combustion noise during transition is suppressed.

Moreover, the engine output decreases and stability of the combustion state is also reduced after the start of the overshoot control. Therefore, the pilot injection is continuously carried out until the stability of the engine output and the combustion state is secured by execution of the fuel injection correction control, so as to suppress a temporary decrease in the engine output and a reduction of the combustion stability. Then, upon the completion of the fuel injection correction control, the pilot injection is at last prohibited.

In the pilot injection control system as described above, the pilot injection is prohibited after processing the overshoot control and the fuel injection correction control processed in the combustion state switching control, while suppressing a temporary increase of the combustion noise, a change in the engine output, and the like, that are caused by the prohibition of the pilot injection in a state in which the second combustion state is not yet established, namely a transition period.

Furthermore, in addition to an essential effect of the pilot injection which reduces the combustion noise by securing a heat source which serves as a pilot burner within the combustion chamber 2 in advance, oxygen in the combustion chamber 2 is actively consumed during a continuing period of the pilot injection. Accordingly, the combustion state which is closer to the low-temperature combustion is established in the combustion chamber 2. Consequently, also in this respect, the combustion noise is reduced and generation of smoke and the like is suppressed.

Next, referring to a time chart shown in FIG. 5, descriptions will be given of details of the pilot injection control to be processed in switching from the low-temperature combustion to the normal combustion.

In switching to the normal combustion, the pilot injection is restarted before the start of the overshoot control which is processed in the combustion state switching control and before the completion of correction of the fuel injection control.

That is, if the pilot injection is restarted after the overshoot control is started, the combustion noise which has been suppressed by the low-temperature combustion increases upon transition to the normal combustion, such as the start of the overshoot control. Thus, in the pilot injection control, the pilot injection is restarted prior to the start of the overshoot control, so as to prevent generation of the combustion noise caused with the start of the overshoot control.

Furthermore, if the pilot injection is restarted after the correction of the fuel injection control is completed, generation of soot and nitrogen oxides (NOx) increases temporarily during transition from the low-temperature combustion to the normal combustion, and ignitability of engine fuel injected also decreases due to a delay in the injection timing. Therefore, by restarting the pilot injection in advance, emission of soot and nitrogen oxides (NOx) is suppressed. At the same time, misfire due to an injection timing delay is suppressed by executing the pilot injection.

In FIG. 5, a timing for restarting the pilot injection and that for starting the overshoot control and the fuel injection correction control are set at the same timing. However, an example shown in FIG. 5 is only one embodiment of the invention, and, for example, the timing for restarting the pilot injection may be set in advance of the overshoot control and the fuel injection correction control.

In the pilot injection control as described above, execution of the pilot injection is restricted such that a time lag exists between a period of engine operation with the combustion state switched to the low-temperature combustion in which the combustion becomes slow and a timing for executing the pilot injection. Furthermore, a prohibition period of the pilot injection is set in consideration of transition of the combustion state and an influence of the fuel injection correction control and the like, thereby suppressing generation of the combustion noise and the like.

The aforementioned embodiment is only one example, and its details may be modified as appropriate within a score of claims.

For example, in the aforementioned embodiment, the pilot injection is restarted in synchronization with the overshoot control and the fuel injection correction control when switching from the low-temperature combustion to the normal combustion. However, a start timing of the overshoot control and the fuel injection correction control may be delayed relative to the start of the pilot injection.

In addition, a control mode and a structure of a control program may be modified appropriately as desired. Such modification may be, for example, prohibiting the pilot injection after an elapse of a predetermined period after switching the combustion state when switching to the low-temperature combustion, and, in addition, predicting a combustion state at the present moment based on a change in each of the aforementioned sensor output so as to control execution and non-execution of the pilot injection according to the combustion state predicted based on the output change.

Furthermore, in a case that the control program is structured so that the pilot injection is prohibited after the elapse of a predetermined time, a time required for switching the combustion state is confirmed in advance based on each preliminary experiment and the like, and the confirmed time is counted after the start of the switching of the combustion state. When the confirmed time reaches a predetermined time, the pilot injection is prohibited. Meanwhile, to give an example of a control of the pilot injection based on an output from each sensor, various methods can be selected for a standard to determined execution and non-execution of the pilot injection, such as to prohibit the pilot injection after detecting an output indicating that, for instance, an air-fuel ratio of exhaust gas detected by the air-fuel ratio sensor 47 is a predetermined value or lower, and the amount of the intake air detected by the air flow meter 45 is a predetermined value or lower.

Moreover, in the foregoing embodiment, the pilot injection is prohibited after the overshoot control and the fuel injection correction control when switching to the low-temperature combustion. However, if a prohibition period of the pilot injection is set in consideration of the reduction of combustion noise only, the pilot injection may be prohibited on the sole condition that the overshoot control is completed.

Furthermore, in the embodiment described above, the pilot injection is restricted in consideration of an increase of combustion noise, a change in the engine output, and the like. Nevertheless, if top priority is given only to the prohibition of the pilot injection during the low-temperature combustion, the time lag may be set as much as possible between an execution timing of the pilot injection and an engine operation period with the combustion state switched into the low-temperature combustion by, for example, switching to the low-temperature combustion after the pilot injection is prohibited, or by switching to the low-temperature combustion when the pilot injection is not executed. In a case the combustion state is switched into the low-temperature combustion after the pilot injection is prohibited, a benefit can also be gained such as suppressing a change in the air-fuel ratio of exhaust gas during transition due to the pilot injection, thereby facilitating the feedback control thereafter. As described above, according to the invention, execution of the pilot injection may be prohibited during a predetermined period including at least a period of engine operation with the combustion state switched into the low-temperature combustion.

Furthermore, in this embodiment, the fuel injection control system may temporarily advance and correct an injection timing of the main fuel injection for the internal combustion engine in a case of the low-temperature combustion, and the pilot injection control system may prohibit the pilot injection, when switching from the normal combustion to the low-temperature combustion, after the overshoot control is executed by the combustion state switching system and also after the fuel injection timing is advanced and corrected by the fuel injection control system.

That is, in addition to the overshoot control, the injection timing of the main fuel injection is advanced by an injection timing correction control which is one control of the fuel injection control system, thereby suppressing a reduction in combustion stability caused in switching to the low-temperature combustion. Furthermore, although the pilot injection is prohibited during the low-temperature combustion, if the pilot injection is prohibited prior to correction (advancement) of the injection timing, ignitability of the main fuel injection is temporarily reduced due to such prohibition of the pilot injection. To deal with this problem, the pilot injection is prohibited after the fuel injection timing is advanced and corrected, thereby enabling the prohibition of the pilot injection without reducing the stability of engine output.

In addition, according to the embodiment, the pilot injection control system may restart, when switching from the low-temperature combustion to the normal combustion, the pilot injection prior to the start of the overshoot control by the combustion state switching system, and also prior to the completion of correction and advancement of the fuel injection timing by the fuel injection control system.

In other words, when switching from the low-temperature combustion to the normal combustion, according to the foregoing structure, the pilot injection is restarted prior to the start of the overshoot control and also prior to the completion of correction and advancement of the fuel injection timing. That is, if the pilot injection is restarted after the completion of correction of the fuel injection volume, the combustion stability is reduced due to a delay in the injection timing during transition from the low-temperature combustion to the normal combustion. Therefore, by restarting the pilot injection in advance, a reduction in the combustion stability due to the delay in the injection timing is suppressed. The term "prior to the completion of correction" referred above also includes a point of time upon the completion of correction.

Each embodiment described above may certainly be combined within a scope of the objective of the invention. For instance, in switching from the first combustion state to the second combustion state as mentioned above, the pilot injection is prohibited after processing all of the overshoot control, the correction of the fuel injection volume, and the correction of the fuel injection timing. Likewise, the embodiments may be combined as appropriate within a scope of each of the foregoing structures.

As described above, the pilot injection is preferably restricted such that a time lag exists as much as possible between a period of the second combustion state in which combustion becomes slow and an executing timing of the pilot injection. Furthermore, generation of combustion noise and the like can be suppressed by setting the prohibition period of the pilot injection in consideration of transition of the combustion state, and an influence of the fuel injection correction control and the like.

According to the embodiments as described above, an internal combustion engine provided with an engine control technology, by which the pilot injection during the low-temperature combustion is restricted, and generation of combustion noise and the like caused by the prohibition of the pilot injection can be suppressed, can be provided.

What is claimed is:

1. An internal combustion engine having a combustion characteristic in which, when a ratio of a inert gas contained in an air-fuel mixture subjected to combustion approaches a predetermined value, an amount of a soot generated during the combustion gradually reaches a peak, and the amount of the soot generated decreases when the ratio is further increased, comprising:

a control unit that switches a first combustion state in which generation of the soot is suppressed by suppressing the ratio of the inert gas below the predetermined value, and a second combustion state in which generation of the soot is suppressed by maintaining the ratio of the inert gas in a range above the predetermined value, and a fuel injection valve that executes, in addition to a main fuel injection for the internal combustion engine, a pilot injection which is a fuel injection preceding the main fuel injection and the pilot injection is stopped for a predetermined period including at least a period of the second combustion state.

2. The internal combustion engine according to claim 1, wherein the fuel injection valve stops the pilot injection after an elapse of a predetermined period after a start of switching from the first combustion state to the second combustion state.

3. The internal combustion engine according to claim 1, wherein the fuel injection valve restarts the pilot injection before switching from the second combustion state to the first combustion state.

4. The internal combustion engine according to claim 1, wherein the inert gas is an EGR gas which flows back from an exhaust passage to an intake passage, the control unit controls a volume of the EGR gas which flows back into the intake passage, controls a volume of an air which flows into a combustion chamber through the intake passage, and once overshoot a control amount of the EGR gas volume and the air volume according to a request for switching a combustion state so as to switch the combustion state at an early stage, and the fuel injection valve stops the pilot injection after an overshoot control when switching to the second combustion state.

5. The internal combustion engine according to claim 4, wherein
the fuel injection valve restarts the pilot injection before the overshoot control is started by the control unit, when switching from the second combustion state to the first combustion state.

6. The internal combustion engine according to claim 4, wherein
the control unit temporarily increases and corrects a fuel injection volume of the main fuel injection for the internal combustion engine during the period of the second combustion state, and
the fuel injection valve stops, when switching from the first combustion state to the second combustion state, the pilot injection after the overshoot control is executed by the control unit and after the fuel injection volume is increased and corrected.

7. The internal combustion engine according to claim 6, wherein
the fuel injection valve restarts, when switching from the second combustion state to the first combustion state, the pilot injection before the overshoot control is started by the control unit and before decreasing and correcting the fuel injection volume is completed.

8. The internal combustion engine according to claim 4, wherein
the control unit temporarily advances and corrects a fuel injection timing of the main fuel injection for the internal combustion engine during the period of the second combustion state, and
the fuel injection valve stops, when switching from the first combustion state to the second combustion state, the pilot injection after the overshoot control is executed by the control unit and after the fuel injection timing is advanced and corrected by the control unit.

9. The internal combustion engine according to claim 8, wherein
the fuel injection valve restarts, when switching from the second combustion state to the first combustion state, the pilot injection before the overshoot control is started by the control unit and before delaying and correcting the fuel injection timing by the control unit is completed.

10. A control method of an internal combustion engine having a combustion characteristic in which, when a ratio of a inert gas contained in an air-fuel mixture subjected to combustion approaches a predetermined value, an amount of a soot generated during the combustion gradually reaches a peak, and the amount of the soot generated decreases when the ratio is further increased, comprising steps of:
switching, based on a switching request signal, a combustion state between a first combustion state in which generation of the soot is suppressed by suppressing the ratio of the inert gas below the predetermined value, and a second combustion state in which generation of the soot is suppressed by maintaining the ratio of the inert gas in a range above the predetermined value,
making a fuel injection system of the internal combustion engine execute, in addition to a main fuel injection for the internal combustion engine, a pilot injection which precedes the main fuel injection, and
prohibiting execution of the pilot injection during a predetermined period including at least a period of the second combustion state.

11. The control method of the internal combustion engine according to claim 10, wherein
the pilot injection is prohibited after an elapse of a predetermined period after a start of switching from the first combustion state to the second combustion state.

12. The control method of the internal combustion engine according to claim 10, wherein
the pilot injection is restarted before switching from the second combustion state to the first combustion state.

13. The control method of the internal combustion engine according to claim 10, wherein
a volume of an EGR gas in which the inert gas flows back into an intake passage is controlled, a volume of an air which flows into a combustion chamber through the intake passage is controlled, and a control amount of the EGR gas volume and the air volume is once overshot according to a request for switching the combustion state so as to switch the combustion state at an early stage.

14. The control method of the internal combustion engine according to claim 13, wherein
the pilot injection is prohibited after an overshoot control, when switching to the second combustion state.

15. The control method of the internal combustion engine according to claim 14, wherein
the pilot injection is restarted before the overshoot control is started, when switching from the second combustion state to the first combustion state.

16. The control method of the internal combustion engine according to claim 14, wherein
a fuel injection volume of the main fuel injection for the internal combustion engine is temporarily increased and corrected at the time of engine operation with the combustion state switched to the second combustion state, and, when switching from the first combustion state to the second combustion state, the pilot injection is prohibited after the overshoot control is executed and after the fuel injection volume is increased and corrected.

17. The control method of the internal combustion engine according to claim 16, wherein
the pilot injection is, when switching from the second combustion state to the first combustion state, restarted before the overshoot control is started and before decreasing and correcting the fuel injection volume is completed.

18. The control method of the internal combustion engine according to claim 14, wherein
a fuel injection timing of the main fuel injection for the internal combustion engine is temporarily advanced and corrected during the period of the second combustion state, and, when switching from the first combustion state to the second combustion state, the pilot injection is prohibited after the overshoot control is executed and after the fuel injection timing is advanced and corrected.

19. The control method of the internal combustion engine according to claim 18, wherein
the pilot injection is, when switching from the second combustion state to the first combustion state, restarted before the overshoot control is started and before delaying and correcting the fuel injection timing is completed.

20. An internal combustion engine having a combustion characteristic in which, when a ratio of a inert gas contained in an air-fuel mixture subjected to combustion approaches a predetermined value, an amount of a soot generated during the combustion gradually reaches a peak, and the amount of the soot generated decreases when the ratio is further increased, comprising:

a combustion state switching system that switches a first combustion state in which generation of the soot is suppressed by suppressing the ratio of the inert gas below the predetermined value, and a second combustion state in which generation of the soot is suppressed by maintaining the ratio of the inert gas in a range above the predetermined value, a fuel injection control system that makes a fuel injection system of the internal combustion engine execute, in addition to a main fuel injection for the internal combustion engine, a pilot injection which precedes the main fuel injection, and a pilot injection control system that prohibits execution of the pilot injection during a predetermined period including at least a period of the second combustion state.

21. The internal combustion engine according to claim 20, wherein the pilot injection control system stops the pilot injection after an elapse of a predetermined period after a start of switching from the first combustion state to the second combustion state.

22. The internal combustion engine according to claim 20, wherein the pilot injection control system restarts the pilot injection before switching from the second combustion state to the first combustion state.

23. The internal combustion engine according to claim 20, wherein the inert gas is an EGR gas which flows back from an exhaust passage to an intake passage, the fuel injection control system controls a volume of the EGR gas which flows back into the intake passage, controls a volume of an air which flows into a combustion chamber through the intake passage, and once overshoot a control amount of the EGR gas volume and the air volume according to a request for switching a combustion state so as to switch the combustion state at an early stage, and the pilot injection control system prohibits the pilot injection after an overshoot control by the combustion state switching system when switching to the second combustion state.

24. The internal combustion engine according to claim 23, wherein the pilot injection control system restarts the pilot injection before the overshoot control is started by the combustion state switching system, when switching from the second combustion state to the first combustion state.

25. The internal combustion engine according to claim 23, wherein the fuel injection control system temporarily decreases and corrects a fuel injection volume of the main fuel injection for the internal combustion engine during the period of the second combustion state, and the pilot injection control system prohibits, when switching from the first combustion state to the second combustion state, the pilot injection after the overshoot control is executed by the combustion state switching system and after the fuel injection volume is decreased and corrected by the fuel injection control system.

26. The internal combustion engine according to claim 25, wherein the pilot injection control system restarts, when switching from the second combustion state to the first combustion state, the pilot injection before the overshoot control is started by the combustion state switching system and before increasing and correcting the fuel injection volume by the fuel injection control system is completed.

27. The internal combustion engine according to claim 23, wherein the fuel injection control system temporarily advances and corrects a fuel injection timing of the main fuel injection for the internal combustion engine during the period of the second combustion state, and the pilot injection control system prohibits, when switching from the first combustion state to the second combustion state, the pilot injection after the overshoot control is executed by the combustion state switching system and after the fuel injection timing is advanced and corrected by the fuel injection control system.

28. The internal combustion engine according to claim 27, wherein the pilot injection control system restarts, when switching from the second combustion state to the first combustion state, the pilot injection before the overshoot control is started by the combustion state switching system and before delaying and correcting the fuel injection timing by the fuel injection control system is completed.

* * * * *